(12) United States Patent
Lee et al.

(10) Patent No.: US 12,724,458 B2
(45) Date of Patent: Sep. 1, 2026

(54) APPARATUS OF MANUFACTURING SUPPORT PANEL WHICH SUPPORTS DISPLAY PANEL AND METHOD OF MANUFACTURING THE SAME

(71) Applicant: Samsung Display Co., LTD., Yongin-si (KR)

(72) Inventors: Changmoo Lee, Yongin-si (KR); Byoung Dae Ye, Yongin-si (KR); Donghwan Kim, Yongin-si (KR); Youngdo Kim, Yongin-si (KR); Jeongweon Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/020,489

(22) Filed: Jan. 14, 2025

(65) Prior Publication Data

US 2025/0315084 A1 Oct. 9, 2025

(30) Foreign Application Priority Data

Apr. 9, 2024 (KR) ........................ 10-2024-0047979

(51) Int. Cl.
*G06F 1/16* (2006.01)

(52) U.S. Cl.
CPC .......... *G06F 1/1643* (2013.01); *G06F 1/1605* (2013.01)

(58) Field of Classification Search
CPC ............................. G06F 1/1643; G06F 1/1605
See application file for complete search history.

(56) References Cited

U.S. PATENT DOCUMENTS 9,695,522 B2 * 7/2017 Im ........................... B05B 12/20
11,618,941 B2 * 4/2023 Moon ..................... C23C 14/24 118/504
2004/0245525 A1 * 12/2004 Yamazaki ............. G07F 7/1025 257/66
2021/0367020 A1 * 11/2021 Bok ................... H10K 59/1213
2022/0042159 A1 * 2/2022 Cho ..................... H10K 71/166
2022/0064779 A1 * 3/2022 Moon .................. H10K 71/166
2023/0009272 A1 * 1/2023 Moon ................. H10K 71/166
2023/0280507 A1 9/2023 Kim et al.
2023/0393629 A1 12/2023 Jung et al.

FOREIGN PATENT DOCUMENTS

KR 1020200088694 A 7/2020
KR 1020230130196 A 9/2023
KR 1020230167771 A 12/2023

* cited by examiner

*Primary Examiner* — Afroza Chowdhury
(74) *Attorney, Agent, or Firm* — CANTOR COLBURN LLP

(57) ABSTRACT

A support panel manufacturing apparatus includes a base part provided with a recess defined therein to allow a display panel to be disposed, a mask part on the base part and including a first region overlapping the display panel in a plan view and a second region surrounding the first region, a discharge part above the mask part, and a heating part between the mask part and the discharge part. The mask part is provided with a through-hole defined therethrough in the first region, the first region includes an edge region adjacent to the second region and a center region surrounded by the edge region in the plan view, and the heating part transfers heat to at least the edge region.

20 Claims, 17 Drawing Sheets

APPARATUS OF MANUFACTURING SUPPORT PANEL WHICH SUPPORTS DISPLAY PANEL AND METHOD OF MANUFACTURING THE SAME

This application claims priority to Korean Patent Application No. 10-2024-0047979, filed on Apr. 9, 2024, and all the benefits accruing therefrom under 35 U.S.C. § 119, the content of which in its entirety is herein incorporated by reference.

BACKGROUND

1. Field

The present disclosure relates to an apparatus of manufacturing a support panel and a method of manufacturing the same. More particularly, the present disclosure relates to an apparatus of manufacturing a support panel with excellent flatness and a method of manufacturing the support panel.

2. Description of Related Art

An electronic device, including a display device such as a smartphone, a digital camera, a laptop computer, a navigation device, and a smart television, provides images to a user through a display screen.

The display device includes a display panel that provides image information and a support panel that protects the display panel. The support panel prevents deformation of the display panel due to external impact and effectively dissipates heat generated from the display panel to protect the display panel. The support panel has a structure in which multiple functional layers are stacked to provide various functions that protect the display panel.

Meanwhile, researches are being conducted on a display device to which a single-layer support panel with various functions is applied to protect a display panel and a manufacturing method of the display device.

SUMMARY

The present disclosure provides an apparatus of manufacturing a support panel with excellent flatness.

The present disclosure provides a method of manufacturing the support panel with excellent flatness.

Embodiments of the invention provide an apparatus for manufacturing a support panel. The apparatus includes a base part provided with a recess formed therein to allow a display panel to be disposed, a mask part on the base part and including a first region overlapping the display panel in a plan view and a second region surrounding the first region, a discharge part above the mask part, and a heating part configured to operate in one of a first state and a second state. The mask part is provided with a through-hole defined therethrough in the first region, the first region includes an edge region adjacent to the second region and a center region surrounded by the edge region in a plan view, the heating part is spaced apart from the mask part in a plan view in the first state, the heating part overlaps the first region in a plan view in the second state, and the heating part is configured to transfer a heat to at least the edge region in the second state.

The heating part may be in the mask part.

The heating part may include a laser irradiation device.

The heating part may be configured to transfer the heat to the edge region and the center region in the second state.

The mask part may include an invar.

The recess may have a size greater than a size of the through-hole in a plan view.

The heating part maintains a temperature of about 60 degrees to about 90 degrees in Celsius for a period of about 1 minute to about 5 minutes in the second state.

Embodiments of the invention provide a method of manufacturing a support panel. The method includes providing a base part in which a recess is formed and a display panel in the recess, placing a mask part in which a through-hole is formed to allow the display panel to overlap the through-hole in a plan view, forming a first preliminary support panel including an edge part directly in contact with the mask part and a center part surrounded by the edge part in the through-hole in the plan view, forming a second preliminary support panel by transferring first heat to at least the edge part, and separating the mask part from the display panel.

The first preliminary support panel may include a polymer resin.

The polymer resin may include at least one of an acrylic-based resin, a urethane-based resin, a fluorine-based resin, an epoxy-based resin, a polyester-based resin, a polyamide-based resin, or a silicone-based resin.

The first preliminary support panel may include a light blocking material.

The light blocking material may include at least one of graphene, carbon black, or carbon nanotubes.

The method may further include transferring second heat to the center part to form the support panel, after the forming of the second preliminary support panel and before the separating of the mask part from the display panel.

The edge part may receive the first heat at a temperature of about 60 degrees to about 90 degrees in Celsius or less for a period of about 1 minute to about 5 minutes in the forming of the second preliminary support panel.

The forming of the first preliminary support panel may include forming a resin pattern to be adjacent to the through-hole on the mask part, and planarizing the resin pattern.

The planarizing of the resin pattern may be performed using a squeegee.

The forming of the second preliminary support panel may include irradiating a laser to transfer the heat.

The through-hole may have a size smaller than a size of the display panel in a plan view.

The first preliminary support panel may be directly in contact with the mask part.

The recess may have substantially the same size as a size of the display panel in a plan view.

According to the above, the support panel manufactured using the apparatus of manufacturing the support panel has excellent flatness after a mask part is removed in a process of manufacturing the support panel, and thus, the reliability of a display device including the support panel is improved.

According to the above, the method of manufacturing the support panel includes the transferring of the heat before removing the mask part, and thus, the support panel has excellent flatness after the mask is removed. Accordingly, the reliability of the display device including the support panel is improved.

BRIEF DESCRIPTION OF THE DRAWINGS

The above and other advantages of the present disclosure will become readily apparent by reference to the following detailed description when considered in conjunction with the accompanying drawings wherein:

FIGS. 12 to 15A are perspective views illustrating processes of a method of manufacturing a support panel according to an embodiment of the present disclosure;

DETAILED DESCRIPTION

Figure 1:
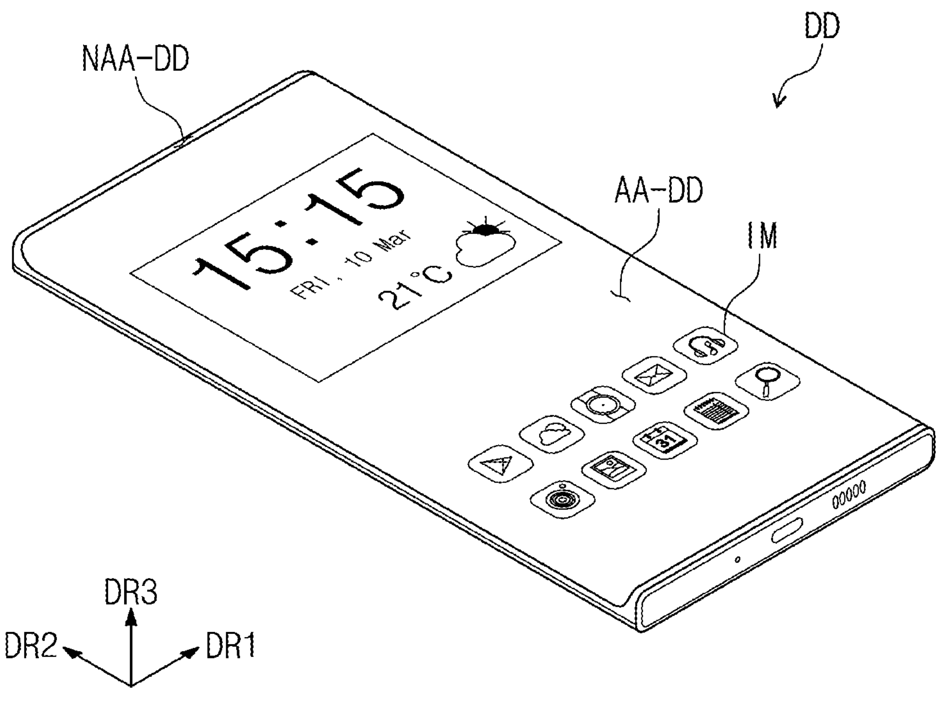
FIG. 1 is a perspective view of a display device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Meanwhile, in the present disclosure, when an element is referred to as being "directly connected" to another element, there are no intervening elements present between a layer, film region, or substrate and another layer, film, region, or substrate. For example, the term "directly connected" may mean that two layers or two members are disposed without employing additional adhesive therebetween.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms "first", "second", etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the disclosure, the expression "at least one of a, b or c" indicates only a, only b, only c, both a and b, both a and c, both b and c, all of a, b, and c, or variations thereof. Hereinafter, embodiments of the present disclosure will be described with reference to accompanying drawings.

Figure 2:
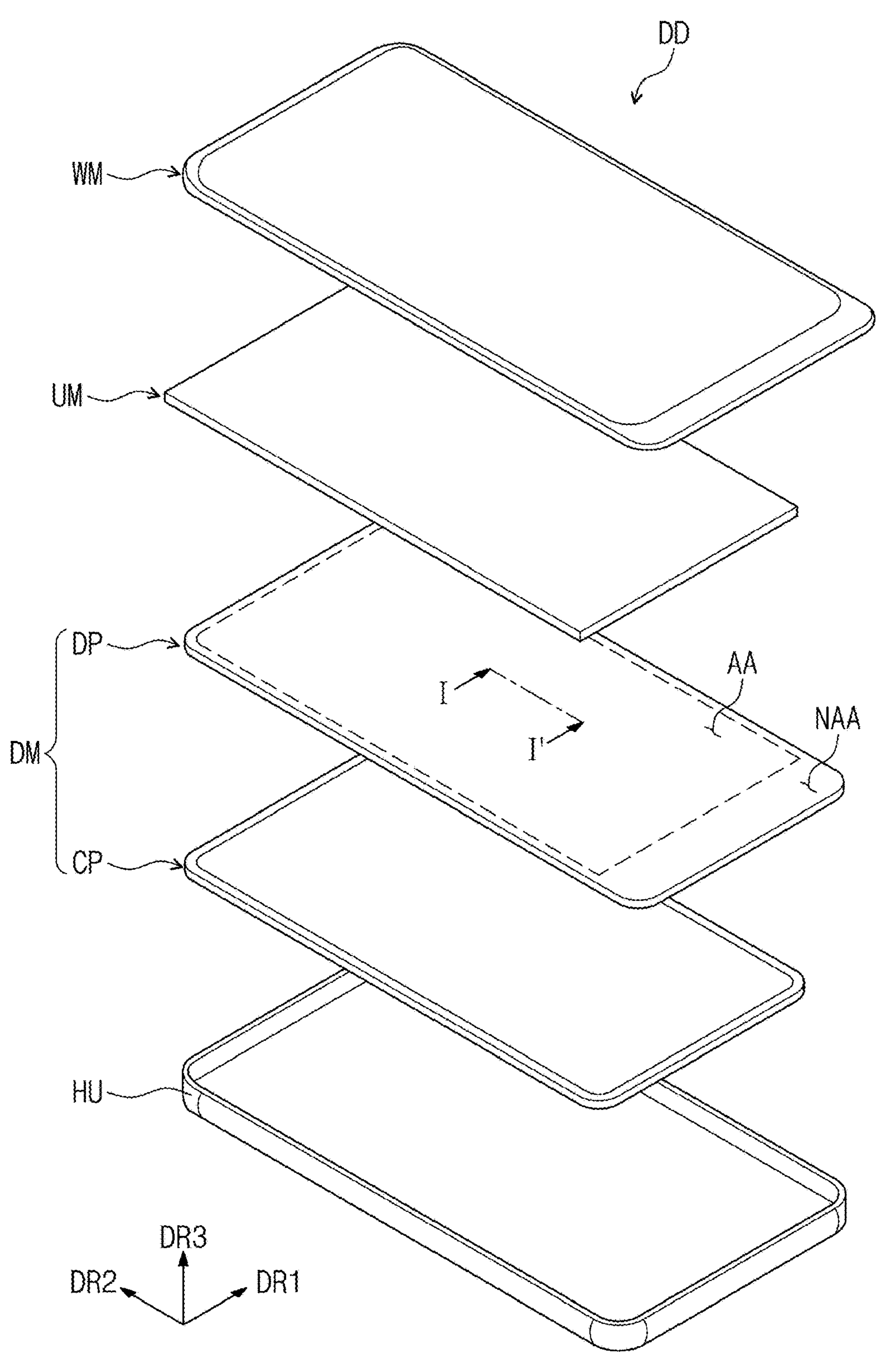
FIG. 2 is an exploded perspective view of a display device according to an embodiment of the present disclosure.

FIG. 1 is a perspective view of a display device DD according to an embodiment of the present disclosure. FIG. 2 is an exploded perspective view of the display device DD according to an embodiment of the present disclosure.

The display device DD may be activated in response to electrical signals. The display device DD may be a mobile phone, a tablet computer, a car navigation unit, a game unit, or a wearable device, however, it should not be limited thereto or thereby. FIG. 1 shows the mobile phone as a representative example of the display device DD.

The display device DD may display an image IM through an active area AA-ED. The active area AA-ED may include a plane defined by a first direction DR1 and a second direction DR2. The active area AA-ED may further include a curved surface bent from at least one side of the plane defined by the first direction DR1 and the second direction DR2. The display device DD shown in FIG. 1 includes two curved surfaces bent from both of opposite sides of the plane defined by the first direction DR1 and the second direction DR2, respectively. However, the shape of the active area AA-ED should not be limited thereto or thereby. For example, the active area AA-ED may include only the plane, or the active area AA-ED may include curved surfaces respectively bent from at least two sides, that is, the active area AA-ED may include four curved surfaces bent from four sides of the plane, respectively.

Meanwhile, in the following descriptions, directions respectively indicated by the first direction DR1, the second direction DR2, and a third direction DR3 may be relative to each other and may be changed in other directions.

In the present disclosure, the first direction DR1 may be substantially perpendicular to the second direction DR2, and the third direction DR3 may be a normal direction with respect to the plane defined by the first direction DR1 and the second direction DR2. In the present disclosure, the expression "in a plan view" means a state of being viewed in the third direction DR3, and a thickness direction of the display device DD (specifically, a thickness direction of a display panel DP) may be substantially parallel to the third direction DR3 that is the normal direction of the plane defined by the first direction DR1 and the second direction DR2.

The display device DD may include the active area AA-ED and a peripheral area NAA-ED adjacent to the active area AA-ED. The active area AA-ED may correspond to a display area AA of the display panel DP described later, and the peripheral area NAA-ED may correspond to a non-display area NAA of the display panel DP.

The peripheral area NAA-ED may be an area to block an optical signal and may be disposed outside the active area AA-ED to surround the active area AA-ED. According to an embodiment, the peripheral area NAA-ED may be defined in a side surface of the display device DD rather than a front surface of the display device DD. According to an embodiment, the peripheral area NAA-ED may be omitted.

The display device DD may include a window WM, an upper member UM, a display module DM, and a housing HU.

The display device DD may include the window WM disposed on the display panel DP. The window WM may provide an exterior of the display device DD. The window WM may cover a front surface of the display panel DP and may protect the display panel DP from external impacts and scratches. The window WM may be attached to the upper member UM by an adhesive layer.

The window WM may include an optically transparent insulating material. As an example, the window WM may include a glass film or a synthetic resin film as its base film. The window WM may have a single-layer or multi-layer structure. For example, the window WM may have a structure in which a plurality of plastic films is coupled to each other by an adhesive or may have a structure in which a glass film and a plastic film are coupled to each other by an adhesive. The window WM may further include a functional layer, such as an anti-fingerprint layer, a phase control layer, a hard coating layer, etc., disposed on a transparent film.

In the display device DD, the upper member UM may be disposed under the window WM and on the display module DM. The upper member UM may include an anti-reflective layer and an input sensing sensor. The anti-reflective layer may reduce a reflectance of the display device DD with respect to an external light. The input sensing sensor may sense an external input generated by the user. The upper member UM may further include an adhesive layer to attach the anti-reflective layer to the input sensing sensor.

In the display device DD, the display module DM may be disposed under the upper member UM. The display module DM may include the display panel DP and a support panel CP. The display panel DP may be disposed under the upper member UM, and the support panel CP may be disposed under the display panel DP.

The display panel DP may include the display area AA through which the image IM is displayed and the non-display area NAA adjacent to the display area AA. That is, the front surface of the display panel DP may include the display area AA and the non-display area NAA. The display area AA may be activated in response to electrical signals and may be an area in which the image IM displayed through the active area AA-ED of the display device DD is generated.

The non-display area NAA may be defined adjacent to the display area AA. The non-display area NAA may surround the display area AA. A driving circuit or a driving line to drive the display area AA, various signal lines or pads to provide electrical signals to the display area AA, or electronic elements may be arranged in the non-display area NAA.

The display panel DP may include a light emitting element layer DP-ED (refer to FIG. 4) that includes an organic light emitting element, a quantum dot light emitting element, a micro light-emitting diode element, or a nano light-emitting diode element. The light emitting element layer DP-ED (refer to FIG. 4) may have a configuration that substantially generates images.

The support panel CP may be disposed under the display panel DP. The support panel CP may support the display panel DP, may absorb impacts applied to the display panel DP, and may perform a heat dissipation function to dissipate heat generated from components, for example, an electronic module (not shown) such as a sensor or a camera, disposed under the display panel DP. The support panel CP will be described in detail later.

Although not shown in figures, the display device DD may include a flexible circuit board electrically connected to the display panel DP and a main circuit board connected to the flexible circuit board. The flexible circuit board may be disposed in the non-display area NAA of the display panel DP and may be coupled with the display panel DP. The flexible circuit board may be connected to the main circuit board. A portion of the non-display area NAA of the display panel DP, which is adjacent to the flexible circuit board, may be provided as a bending area. The bending area may be bent with respect to a bending axis substantially parallel to the first direction DR1. When the bending area is bent, the flexible circuit board may overlap a portion of the display panel DP in a plan view.

The display device DD may include the housing HU disposed under the display panel DP. The housing HU may accommodate the electronic module (not shown) and the display panel DP. The window WM may be coupled with the housing HU to form an exterior of the display device DD.

Figure 3:
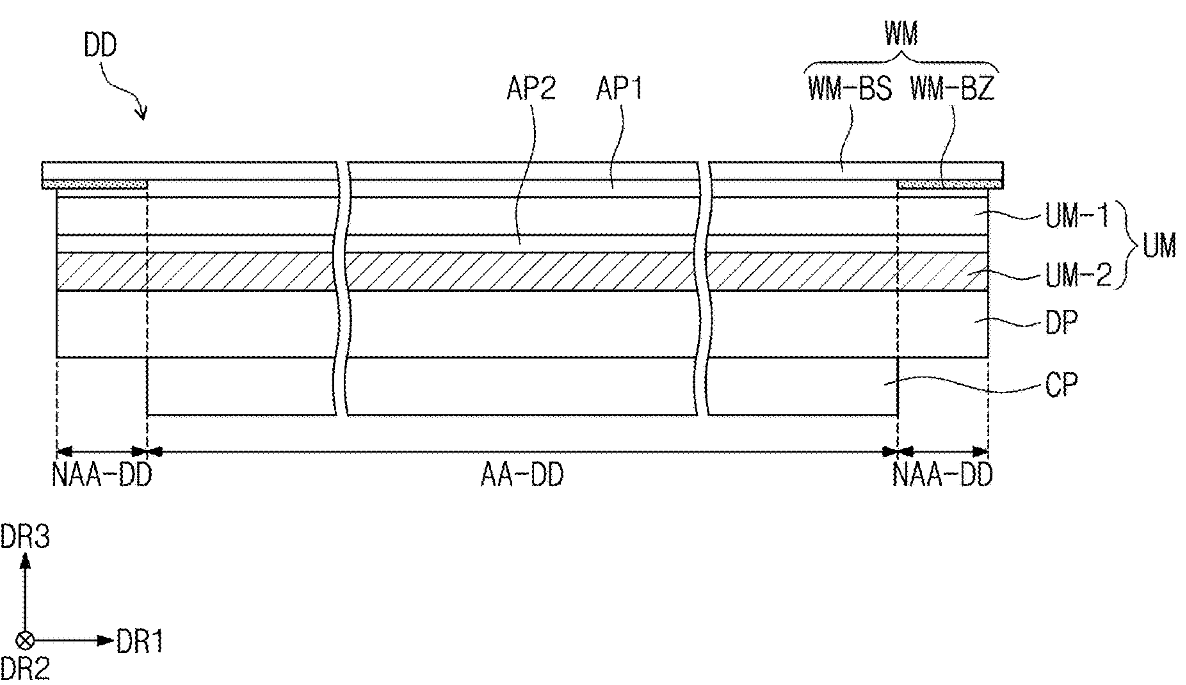
FIG. 3 is a cross-sectional view of a portion of a display device according to an embodiment of the present disclosure.

FIG. 3 is a cross-sectional view of a portion of the display device DD according to an embodiment of the present disclosure.

Referring to FIG. 3, the display device DD may include the window WM, the upper member UM, the display panel DP, and the support panel CP. The display device DD may include the front surface and a rear surface, the front surface of the display device DD may be defined on the window WM, and the rear surface of the display device DD may be defined on the support panel CP.

The window WM may cover a front surface of the display panel DP. The window WM may include a base substrate WM-BS and a bezel pattern WM-BZ. The base substrate WM-BS may include a transparent base layer such as a glass substrate and a transparent film. The base substrate WM-BS may have a multi-layer structure. The bezel pattern WM-BZ having the multi-layer structure may include a colored layer and a light blocking layer having a black color. The colored layer and a light blocking layer and the black light-blocking layer may be formed through a depositing, printing, or coating process. The bezel pattern WM-BZ may be omitted from the window WM and may be disposed on the upper member UM rather than the base substrate WM-BS.

The upper member UM may include an anti-reflective layer UM-1 and an input sensor UM-2. As shown in FIG. 3, the window WM may be coupled with the anti-reflective layer UM-1 by a first adhesive layer AP1, and the input sensor UM-2 may be coupled with the anti-reflective layer UM-1 by a second adhesive layer AP2. In another embodiment, at least one of the first adhesive layer AP1 or the second adhesive layer AP2 may be omitted. As an example, the second adhesive layer AP2 may be omitted, and the anti-reflective layer UM-1 may be disposed directly on the input sensor UM-2.

The anti-reflective layer UM-1 may decrease a reflectance of the display device DD with respect to an external light. As an example, the anti-reflective layer UM-1 may include a polarizer and/or a retarder. The anti-reflective layer UM-1 may include a polarizing film or color filters. The color filters may be arranged in a predetermined arrangement. The arrangement of the color filters may be determined by taking into account light emission colors of pixels included in the display panel DP. The anti-reflective layer UM-1 may further include a dividing layer adjacent to the color filters.

The input sensor UM-2 may include a plurality of sensing electrodes (not shown) to sense an external input, a plurality of trace lines (not shown) connected to the sensing electrodes, and an inorganic layer and/or an organic layer to insulate and protect the sensing electrodes or the trace lines. The input sensor UM-2 may be a capacitive sensor, however, it should not be particularly limited.

The input sensor UM-2 may be directly disposed on a thin film encapsulation layer through successive processes when the display panel DP is manufactured, however, the present disclosure should not be limited thereto or thereby. According to an embodiment, the input sensor UM-2 may be attached to the display panel DP by an adhesive layer after being manufactured separately from the display panel DP.

The support panel CP may be disposed under the display panel DP. The support panel CP may support the display panel DP and may perform heat dissipation function to dissipate the heat generated from the display panel DP. The support panel CP will be described in detail with reference to FIG. 6.

Figure 4:
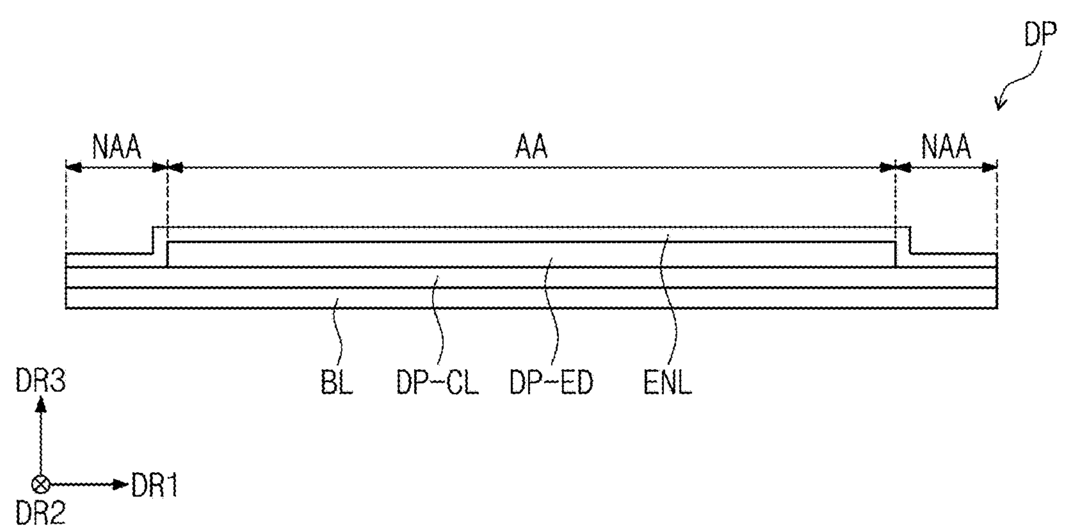
FIG. 4 is a cross-sectional view of a display panel according to an embodiment of the present disclosure.

FIG. 4 is a cross-sectional view of the display panel DP according to an embodiment of the present disclosure.

The display panel DP may include a base layer BL, a circuit layer DP-CL, a light emitting element layer DP-ED, and an encapsulation layer ENL. The circuit layer DP-CL, the light emitting element layer DP-ED, and the encapsulation layer ENL may be disposed on the base layer BL.

The base layer BL may include a plastic substrate, a glass substrate, a metal substrate, or an organic/inorganic composite material substrate. As an example, the base layer BL may include at least one polyimide layer. The support panel CP (refer to FIG. 3) may be disposed under the base layer BL.

The circuit layer DP-CL may include at least one insulating layer, semiconductor patterns, and conductive patterns. The insulating layer may include at least one organic layer and at least one inorganic layer. The semiconductor patterns and the conductive patterns may form signal lines, a pixel driving circuit, and a scan driving circuit. In addition, the circuit layer DP-CL may include a rear-surface metal layer.

The light emitting element layer DP-ED may include a display element, e.g., a light emitting element. As an example, the light emitting element may be the organic light emitting element, the quantum dot light emitting element, the micro light-emitting diode element, or the nano light-emitting diode element. The light emitting element layer DP-ED may further include an organic layer such as a pixel definition layer.

The light emitting element layer DP-ED may be disposed in the display area AA. The non-display area NAA may be disposed outside the display area AA to surround the display area AA, and the light emitting element may not be disposed in the non-display area NAA.

The encapsulation layer ENL may be on the light emitting element layer DP-ED to cover the light emitting element layer DP-ED. The encapsulation layer ENL may be disposed on a portion of the circuit layer DP-CL to encapsulate the light emitting element layer DP-ED. The encapsulation layer ENL may be a thin film encapsulation layer including a plurality of organic thin layers and an inorganic thin film layers. The encapsulation layer ENL may include a thin film encapsulation layer having a stack structure of an inorganic layer/an organic layer/an inorganic layer. The structure of the encapsulation layer ENL should not be particularly limited.

Figure 5:
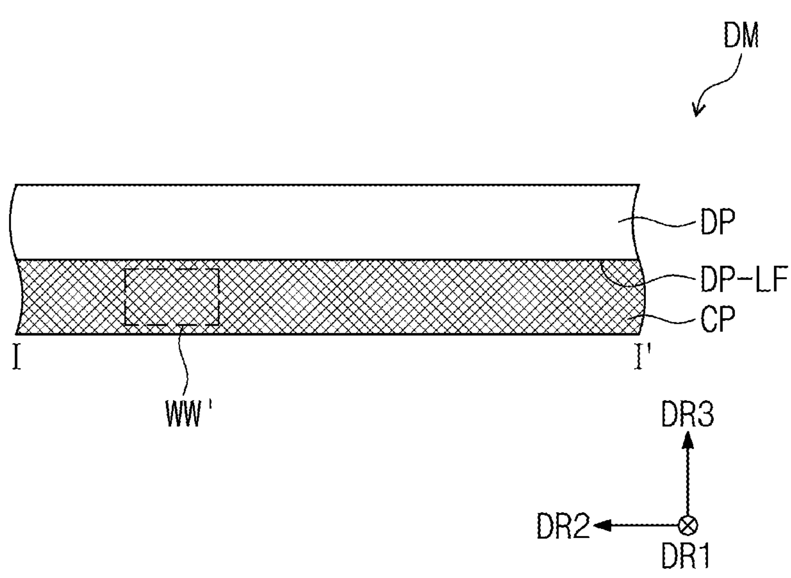
FIG. 5 is a cross-sectional view of a portion of a display device according to an embodiment of the present disclosure.
Figure 6:
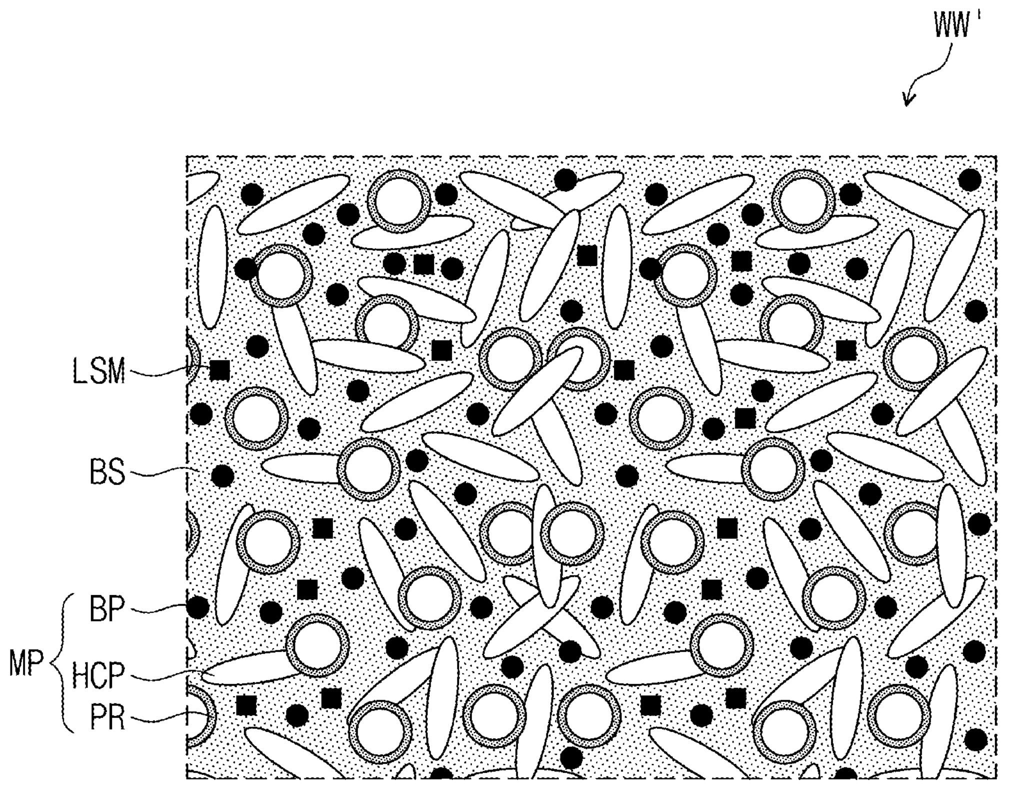
FIG. 6 is an enlarged cross-sectional view of a portion of a display device according to an embodiment of the present disclosure.

FIG. 5 is a cross-sectional view of a portion of the display module DM according to an embodiment of the present disclosure. FIG. 5 illustrates a cross-sectional view taken along line I-I' of FIG. 2. FIG. 6 is an enlarged cross-sectional view of a portion of the display module DM according to an embodiment of the present disclosure. FIG. 6 is an enlarged cross-sectional view of an area WW' of FIG. 5. FIG. 6 is a detailed view of the support panel CP according to an embodiment of the present disclosure.

Referring to FIGS. 5 and 6, the display module DM may include the display panel DP and the support panel CP.

The support panel CP may be disposed under the display panel DP. The support panel CP may be disposed directly on a lower portion of the display panel DP. The support panel CP may be in contact with a lower surface DP-LF of the display panel DP. A separate adhesive member may not be disposed between the support panel CP and the display panel DP. The support panel CP disposed on the lower surface DP-LF of the display panel DP may have a single-layer structure. The support panel CP may support the display panel DP, may absorb impacts applied to the display panel DP, and may perform the heat dissipation function to dissipate the heat generated from components, for example, the electronic module (not shown), disposed under the display panel DP. As the support panel CP having the single-layer structure absorbs the impacts while performing the heat dissipation function, a thickness of the display device DD may decrease, parts of the display device DD may be simplified, and a process efficiency may increase when manufacturing the display device DD.

The support panel CP may include a polymer resin BS. The polymer resin BS may include at least one of an acrylic-based resin, a urethane-based resin, a fluorine-based resin, an epoxy-based resin, a polyester-based resin, a polyamide-based resin, or a silicone-based resin. The polymer resin BS may include a curable resin. As an example, the polymer resin BS may include a thermosetting resin.

The support panel CP may include a filler MP. The support panel CP may include a plurality of fillers MP distributed in the polymer resin BS. As the support panel CP includes the filler MP, the support panel CP may perform multiple functions within the display device. The filler MP may include a shielding material BP, a heat dissipation material HCP, and a support material PR. The filler MP may be used by mixing two or more materials of different types or sizes. As the filler MP includes the shielding material BP, the support panel CP may have electromagnetic shielding characteristics. As the filler MP includes the heat dissipation material HCP, the support panel CP may perform the heat dissipation function to dissipate the heat generated from the display panel DP. The heat dissipation material HCP may include, for example, at least one of a thermally conductive metal, a carbon-based heat dissipation material, or a thermally conductive polymer. As the filler MP includes the support material PR, the protective property of the support panel CP that protects the display panel DP from physical impacts applied to the display panel DP from the outside may be improved.

FIG. 6 illustrates the structure in which the filler MP includes the shielding material BP, the heat dissipation material HCP, and the support material PR, however, the present disclosure should not be limited thereto or thereby. According to an embodiment, the support panel CP may perform other functions in the display device DD (refer to FIG. 3) depending on a material included in the support panel CP, a thickness of the support panel CP, and components included in the display device DD (refer to FIG. 3). As an example, the filler MP may further include a light blocking material, and the support panel CP may further perform a light blocking function to block a light emitted from the display panel DP.

The filler MP may have an average diameter equal to or greater than about 5 μm and equal to or smaller than about 300 μm. As an example, each of the shielding material BP, the heat dissipation material HCP, and the support material PR may have an average diameter equal to or greater than about 5 μm and equal to or smaller than about 300 μm. The filler MP may have a substantially monodisperse size distribution or a polydisperse distribution obtained by mixing a plurality of particles with a monodisperse distribution. When the average diameter of the filler MP is smaller than about 5 μm, it is difficult to implement the shielding, heat dissipation or support characteristics of the support panel CP, and when the average diameter of the filler MP is greater than about 300 μm, the dispersion characteristics of the filler MP may deteriorate in the support panel CP, and it is difficult to secure uniform thin film characteristics. In FIG. 6, the average diameter and cross-sectional shape of the shielding material BP, the heat dissipation material HCP, and the support material PR are shown arbitrarily, however, the average diameter and cross-sectional shape of each of the fillers MP should not be limited thereto or thereby and may be implemented in various ways.

The filler MP may be included in an amount equal to or smaller than about 90 weight percentages (wt %) based on a total weight of the support panel CP. As an example, the filler MP may be included in an amount equal to or greater than about 50 wt % and equal to or smaller than about 90 wt % based on the total weight of the support panel CP. When the amount of the filler MP is smaller than about 50 wt %, the heat dissipation characteristics of the support panel CP may deteriorate. In addition, when the amount of the filler MP is greater than about 90 wt %, the impact absorbing characteristics of the support panel CP may excessively deteriorate, and the display panel DP may be damaged due to external impacts.

The support panel CP may include the light blocking material LSM. As the support panel CP includes the light blocking material LSM, the support panel CP may have light blocking characteristics. That is, when the support panel CP includes the light blocking material LSM, a phenomenon of external light reaching the lower surface DP-LF of the display panel DP and impairing luminance of the display panel DP may be improved. The light blocking material LSM may include at least one of graphene, carbon black, or carbon nanotubes. As an example, the light blocking material LSM may be graphene.

Figure 7A:
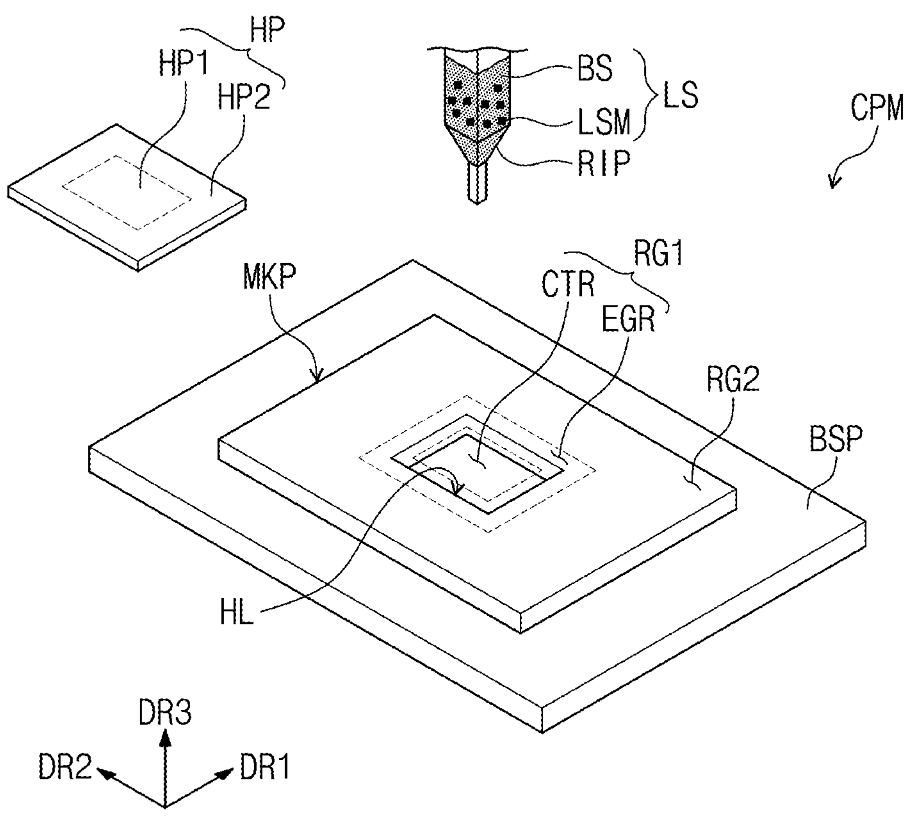
FIGS. 7A and 7B are perspective views of an apparatus of manufacturing a support panel according to an embodiment of the present disclosure.
Figure 7B:
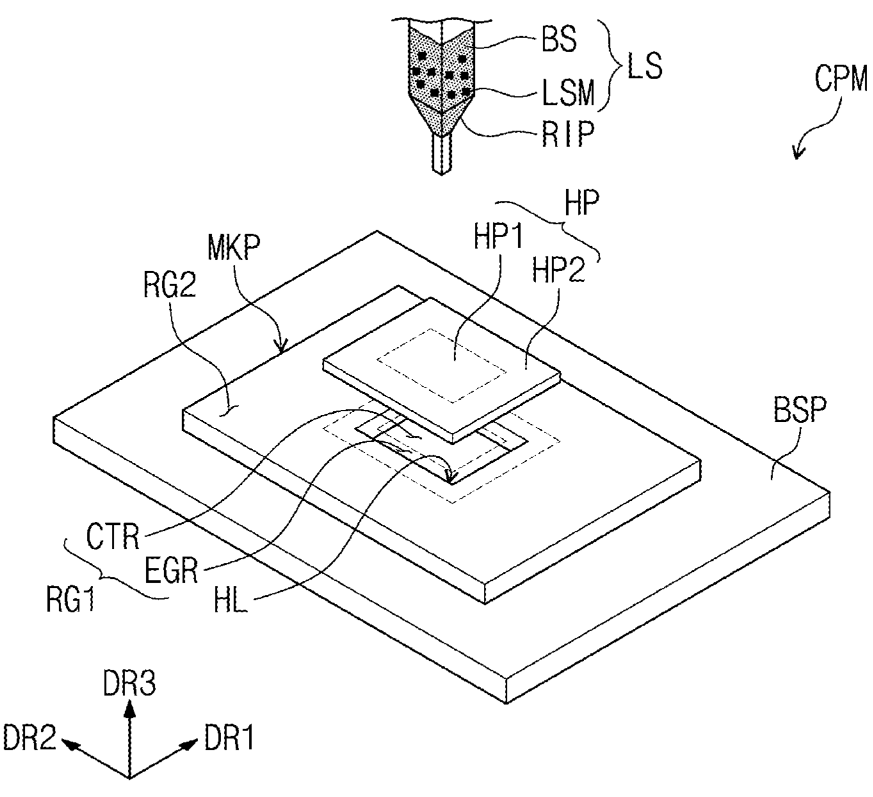
Figure 8:
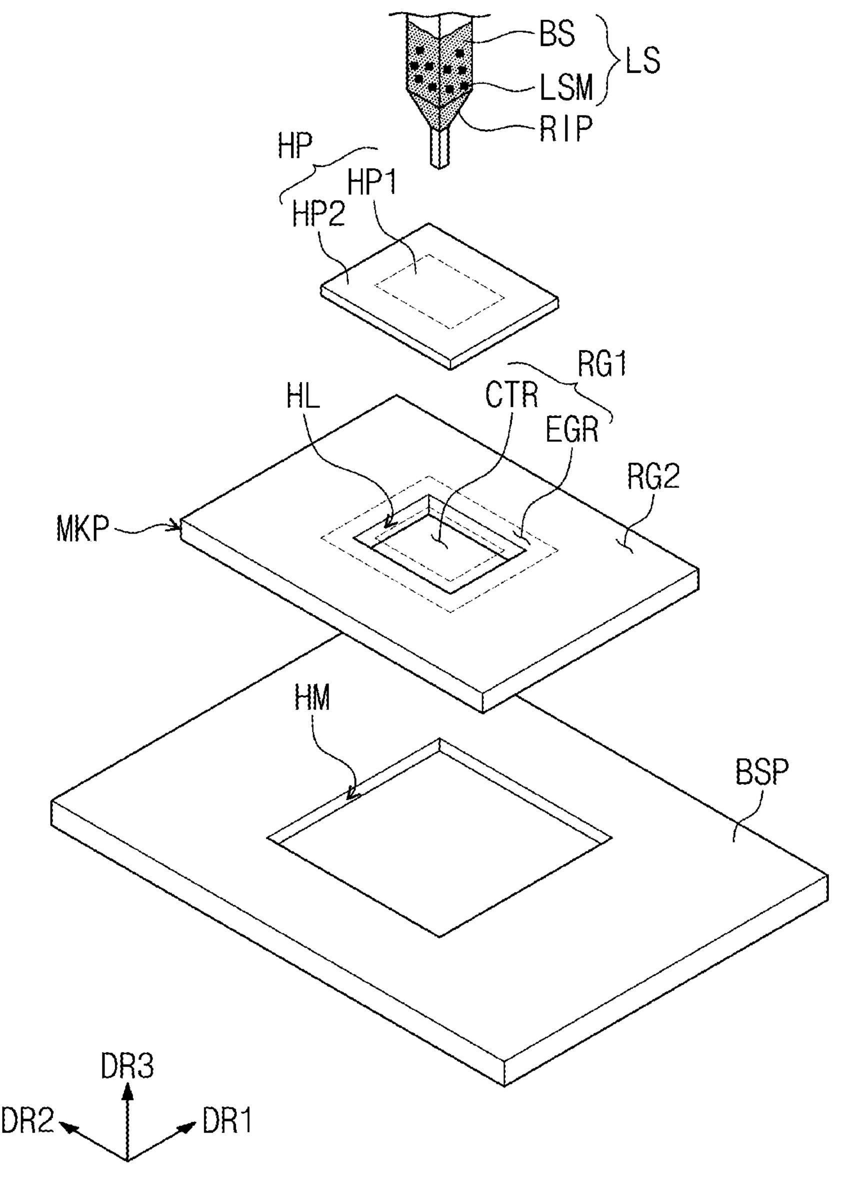
FIG. 8 is an exploded perspective view of an apparatus of manufacturing a support panel according to an embodiment of the present disclosure.
Figure 9:
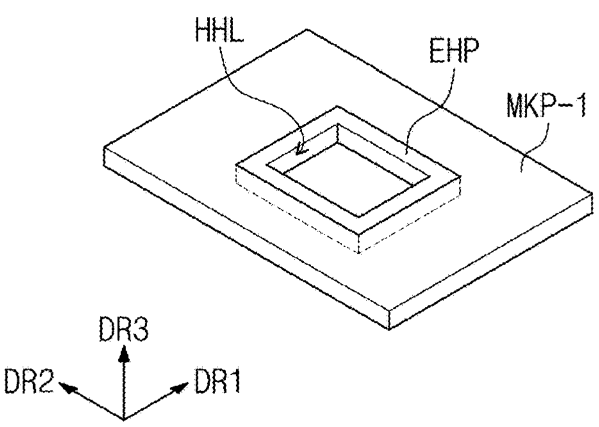
FIG. 9 is a perspective view of a portion of an apparatus of manufacturing a support panel according to another embodiment of the present disclosure.
Figure 10:
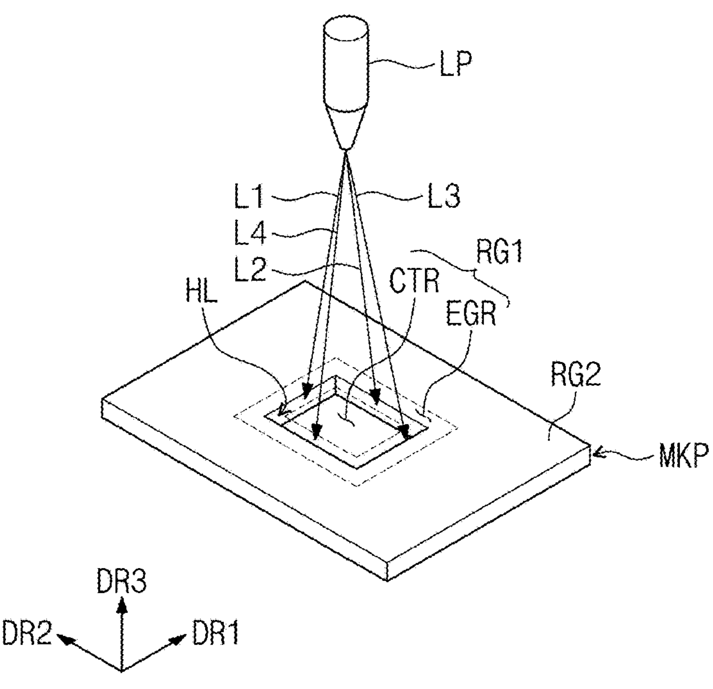
FIG. 10 is a perspective view of a portion of an apparatus of manufacturing a support panel according to still another embodiment of the present disclosure.

FIGS. 7A and 7B are perspective views of an apparatus of manufacturing the support panel (hereinafter, referred to as support panel manufacturing apparatus) according to an embodiment of the present disclosure. FIG. 8 is an exploded perspective view of the support panel manufacturing apparatus according to an embodiment of the present disclosure. FIG. 8 is an exploded perspective view of the support panel manufacturing apparatus shown in FIG. 7B. FIG. 9 is a perspective view of a portion of a support panel manufacturing apparatus according to another embodiment of the present disclosure. FIG. 10 is a perspective view of a portion of the support panel manufacturing apparatus according to still another embodiment of the present disclosure.

Referring to FIGS. 7A, 7B, and 8, the support panel manufacturing apparatus CPM may include a base part BSP, a mask part MKP, a discharge part RIP, and a heating part HP. The above descriptions on the support panel CP with reference to FIGS. 2 to 6 may be equally applied to the support panel manufactured by the support panel manufacturing apparatus CPM.

The base part BSP may be provided with a recess HM defined therein. The recess HM may have a depth smaller than a thickness of the base part BSP. The recess HM may be provided to accommodate the display panel (refer to DP of FIG. 12) described later with reference to FIG. 12. The base part BSP may include a metal material. As an example, the base part BSP may include invar. The base part BSP may support the mask part MKP when the support panel manufacturing apparatus CPM operates.

Figure 14A:
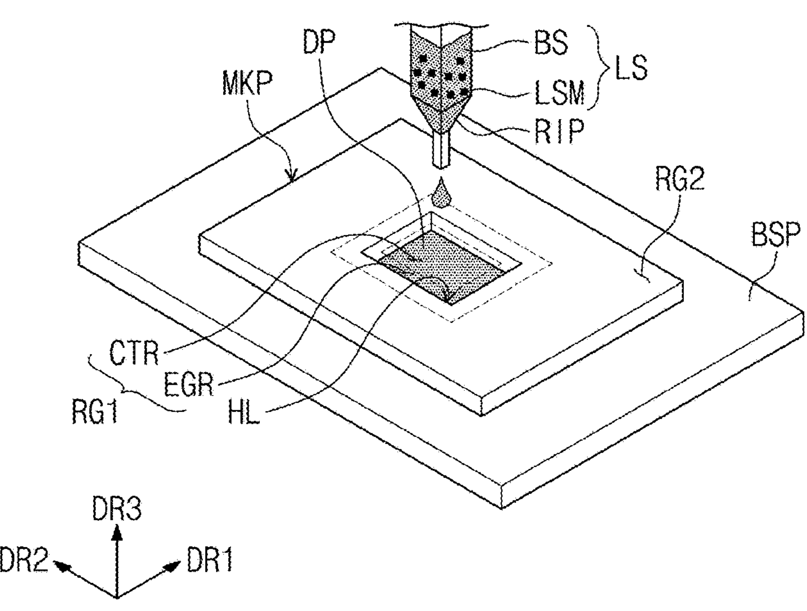
Figure 14B:
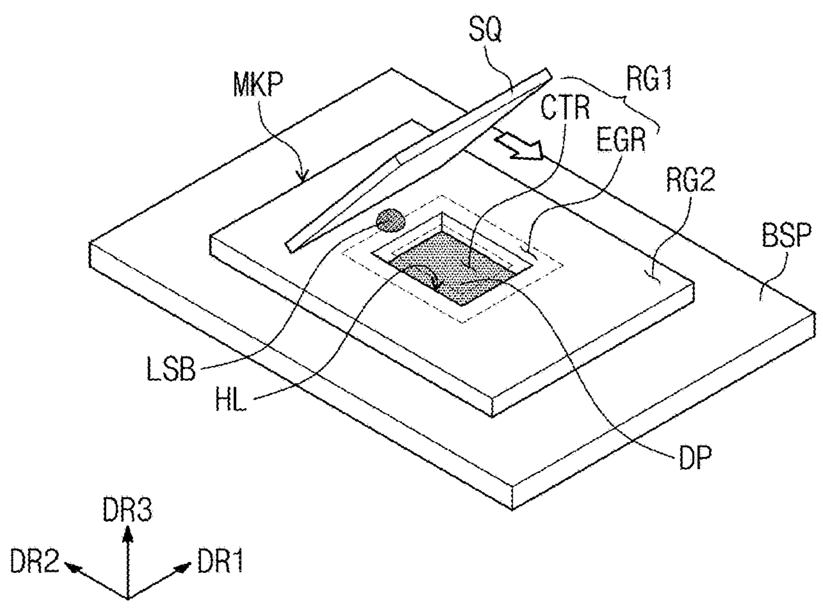
Figure 14C:
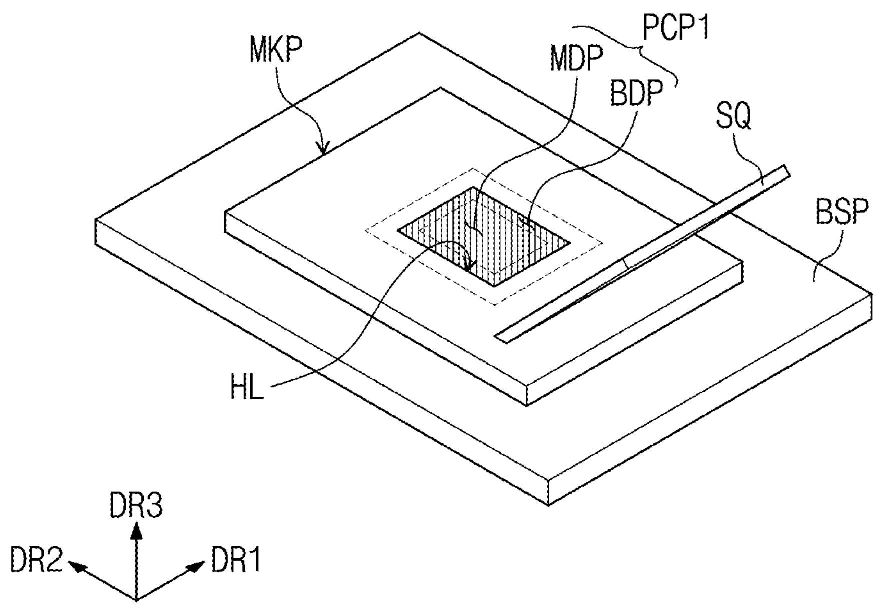

The mask part MKP may be disposed on the base part BSP. The mask part MKP may be disposed directly on the base part BSP. The mask part MKP may include invar. The mask part MKP may include a first region RG1 that overlaps the display panel DP (refer to FIG. 12) disposed in the recess HM of the base part BSP in a plan view and a second region RG2 surrounding the first region RG1 in a plan view. In the support panel manufacturing apparatus CPM, the third direction DR3, which is a reference direction for the plan view, is a thickness direction of the base part BSP in which the display panel DP is formed. The mask part MKP may be provided with a through-hole HL defined therethrough in the first region RG1. The through-hole HL may completely penetrate through the mask part MKP. The through-hole HL may serve as a space in which a first preliminary support panel PCP1 (refer to FIG. 14C) described later is formed.

The first region RG1 may be defined on the base part BSP. The first region RG1 may be defined directly on the base part BSP. The first region RG1 may overlap the display panel DP (refer to FIG. 12) in a plan view. The first region RG1 may include an edge region EGR adjacent to the second region RG2 and a center region CTR surrounded by the edge region EGR in a plan view. Each of the edge region EGR and the center region CTR may have a quadrangular shape, however, each of the edge region EGR and the center region CTR may have a polygonal shape other than the quadrangular shape or a circular shape in another embodiment. The recess HM may have a size greater than a size of the through-hole HL in a plan view. The size of the through-hole HL may be greater than a size of the center region CTR in a plan view. The size of the through-hole HL may be smaller than a sum of the size of the center region CTR and a size of the edge region EGR in a plan view. The second region RG2 may correspond to an area of the mask part MKP except the first region RG1.

The discharge part RIP may be disposed above the mask part MKP. The discharge part RIP may be disposed directly above the mask part MKP. The discharge part RIP may accommodate a resin LS containing the polymer resin BS and the light blocking material LSM and may discharge the resin LS. The discharge part RIP may discharge the resin LS onto the mask part MKP. The discharge part RIP may discharge the resin LS onto the edge region EGR. The resin LS discharged onto the edge region EGR by the discharge part RIP may correspond to a resin pattern LSB (refer to FIG. 14B) described later.

The heating part HP may operate in a first state and a second state. In the first state (See FIG. 7A), the heating part HP may be spaced apart from the mask part MKP in a plan view. In the first state, the discharge part RIP may discharge the resin LS onto the mask part MKP. In the second state (See FIG. 7B), the heating part HP may overlap the first region RG1 in a plan view. In the second state, the heating part HP may be placed close enough to the first region RG1 to transfer heat to the first region RG1. The heating part HP may include a first heating part HP1 and a second heating part HP2. The first heating part HP1 may overlap the center region CTR in a plan view. The first heating part HP1 may have substantially the same size as the size of the center region CTR in a plan view. The second heating part HP2 may surround the first heating part HP1 in a plan view. The second heating part HP2 may overlap the edge region EGR in a plan view in the second state. The second heating part HP2 may have substantially the same size as the size of the edge region EGR in a plan view.

The heating part HP may include a metal material. The heating part HP may transfer the heat to at least the edge region EGR in the second state. The heating part HP may transfer the heat to the edge region EGR and the center region CTR in the second state. The first heating part HP1 may transfer the heat to the center region CTR in the second state. The second heating part HP2 may transfer the heat to the edge region EGR in the second state. The heating part HP may maintain a temperature of about 60 degrees in Celsius (C°) or more and about 90 degrees in Celsius or less for a period of not less than about 1 minute but not more than about 5 minutes in the second state. As an example, the heating part HP may maintain a temperature of about 90 degrees in Celsius for about 5 minutes in the second state.

Referring to FIG. 9, a heating part EHP may be disposed in a mask part MKP-1. The mask part MKP-1 may be provided with a through-hole HHL defined therethrough. The heating part EHP may be disposed adjacent to the through-hole HHL. An outer surface of the heating part EHP may define the through-hole HHL. The through-hole HHL may correspond to the through-hole HL (refer to FIG. 8). The heating part EHP may transfer heat to an inner space of the through-hole HHL. When the heating part EHP is disposed in the mask part MKP-1, the heating part EHP and the mask part MKP-1 may be managed and move together, and thus, the convenience in manufacturing may be improved.

Referring to FIG. 10, the support panel manufacturing apparatus may include a laser irradiation device LP as the heating part instead of the heating part HP described with reference to FIG. 8. The laser irradiation device LP may transfer heat by irradiating a laser to a target point where the heat is to be transferred. The laser irradiation device LP shown in FIG. 10 may irradiate first, second, third, and fourth lights L1, L2, L3, and L4 as a representative example. Each of the first, second, third, and fourth lights L1, L2, L3, and L4 may be irradiated to the edge region EGR, and the heat may be transferred to the edge region EGR.

Figure 11:
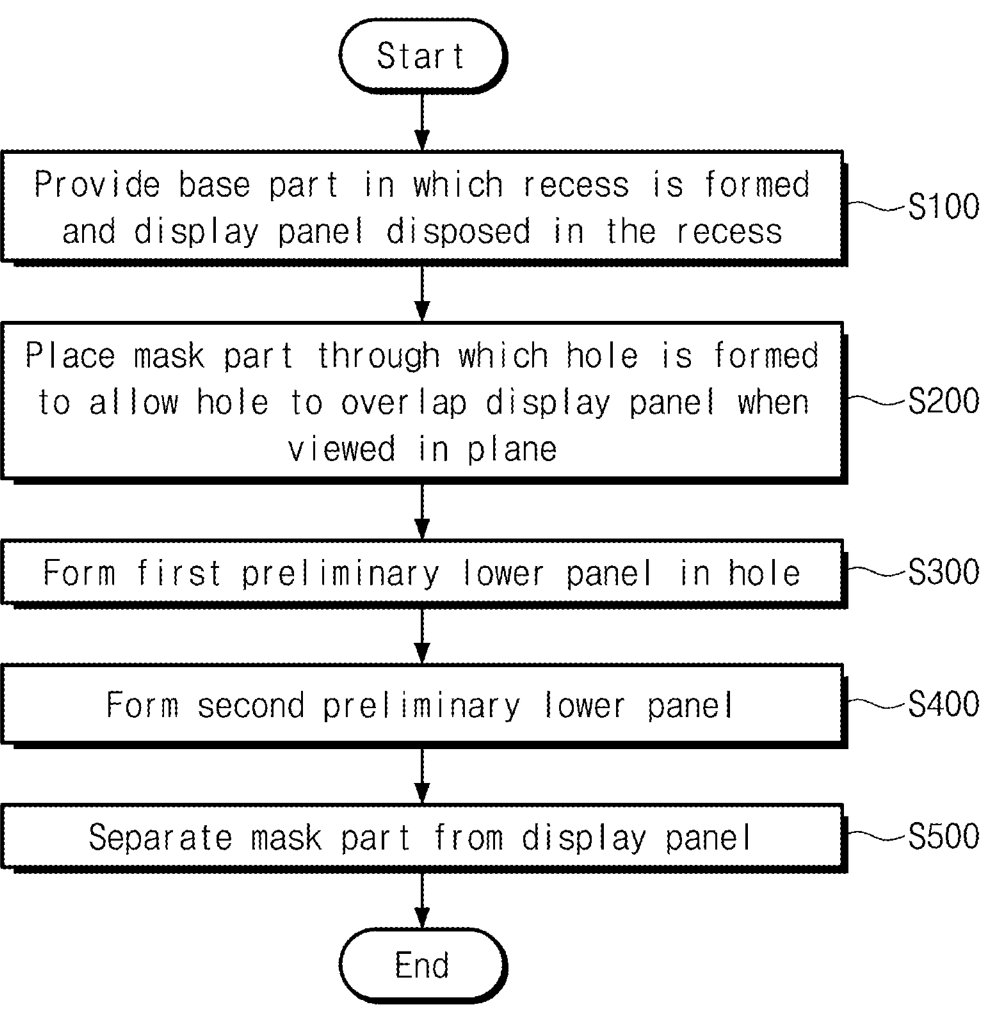
FIG. 11 is a flowchart illustrating a method of manufacturing a support panel according to an embodiment of the present disclosure.

FIG. 11 is a flowchart illustrating a method of manufacturing the support panel (hereinafter, referred to as support panel manufacturing method) according to an embodiment of the present disclosure. FIGS. 12 to 15A are perspective views illustrating processes of the support panel manufacturing method according to an embodiment of the present disclosure. FIGS. 15B to 15E are cross-sectional views taken along line II-II' of FIG. 15A to illustrate processes of the support panel manufacturing method. FIG. 15F is a perspective view illustrating a process of the support panel manufacturing method according to another embodiment of the present disclosure. FIG. 16 is a cross-sectional view taken along line II-II' of FIG. 15A to illustrate a process of the support panel manufacturing method.

Hereinafter, in FIGS. 11, 12, 13A, 13B, 14A to 14C, 15A to 15F, and 16, the same reference numerals denote the same elements in FIGS. 1 to 10, and thus, detailed descriptions of the same elements will be omitted.

Referring to FIG. 11, the support panel manufacturing method may include: providing the base part in which the recess is formed and the display panel disposed in the recess (S100), placing the mask part through which the through-hole is formed to allow the through-hole to overlap the display panel in a plan view (S200), forming the first preliminary support panel in the through-hole (S300), forming a second preliminary support panel (S400), and separating the mask part from the display panel (S500).

Figure 12:
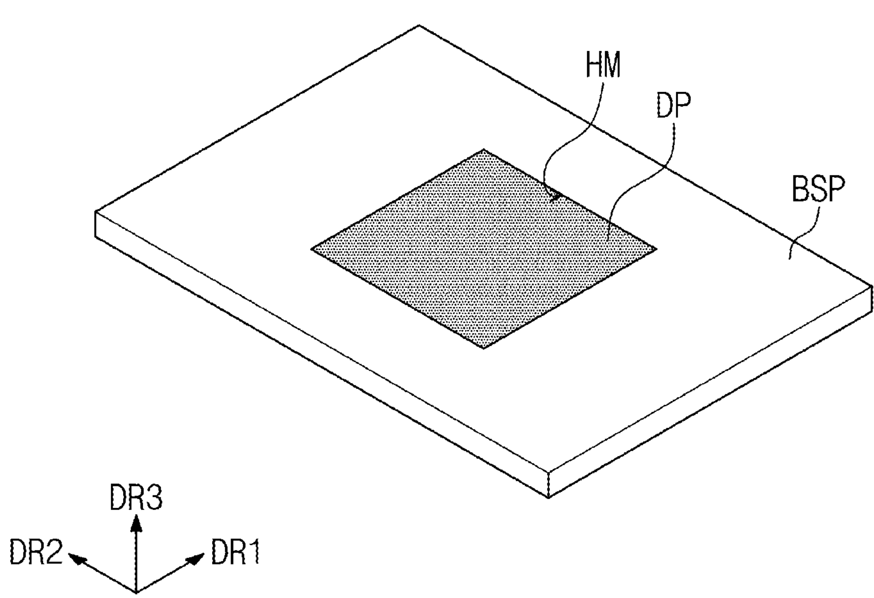

Referring to FIGS. 11 and 12, the size of the display panel DP may be substantially the same as the size of the recess HM in a plan view in the providing of the base part BSP and the display panel DP (S100). The thickness of the display panel DP may be substantially the same as the depth of the recess HM. The display panel DP may be accommodated in the recess HM and may be fixed not to be separated from the base part BSP in the manufacturing process of the support panel. The display panel DP may be disposed to allow the lower surface DP-LF (refer to FIG. 5) to face the third direction DR3.

Figure 13A:
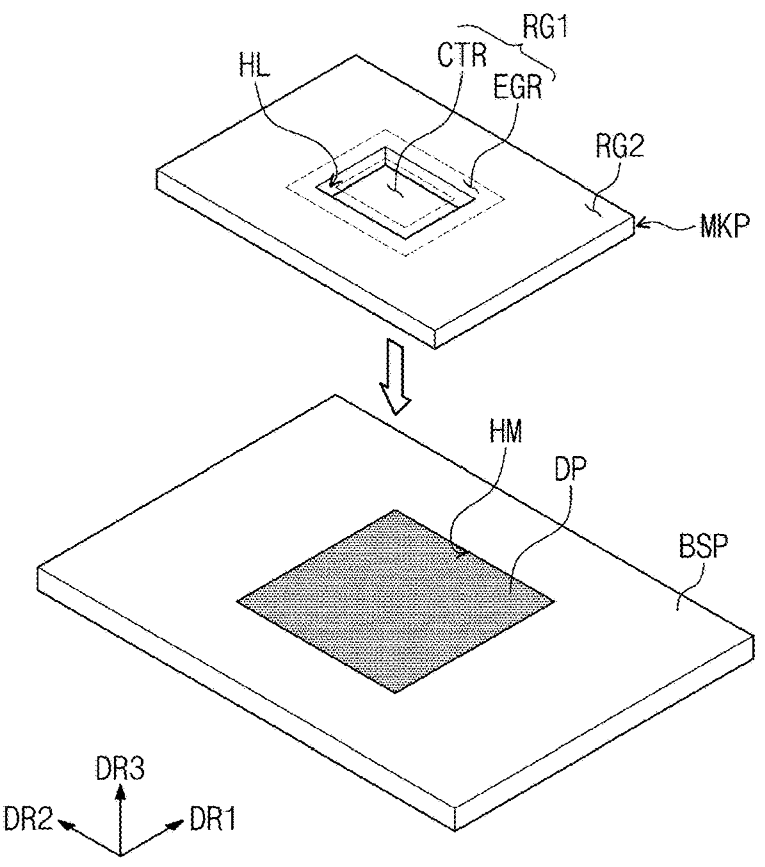
Figure 13B:
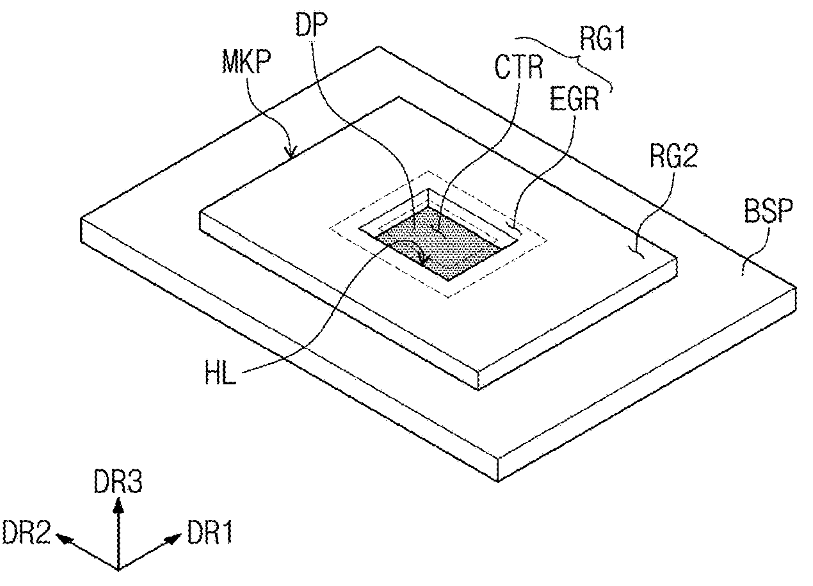

Referring to FIGS. 11, 13A, and 13B, the mask part MKP may be disposed directly on the display panel DP in the placing of the mask part MKP to allow the display panel DP to overlap the through-hole HL in a plan view (S200). The through-hole HL may have the size greater than the size of the display panel DP in a plan view. At least a portion of the lower surface DP-LF (refer to FIG. 5) of the display panel DP may be exposed through the through-hole HL. The exposed portion of the lower surface DP-LF (refer to FIG. 5) of the display panel DP, which is exposed through the through-hole HL, may have a size greater than the size of the center region CTR in a plan view and may be smaller than the sum of the size of the center region CTR and the size of the edge region EGR.

Referring to FIGS. 11 and 14A to 14C, the first preliminary support panel PCP1 may include a center part MDP and an edge part BDP in the forming of the first preliminary support panel PCP1 in the through-hole HL (S300). The first preliminary support panel PCP1 may be directly in contact with the mask part MKP. The edge part BDP may be directly in contact with the mask part MKP. The first preliminary support panel PCP1 may include the polymer resin BS. The polymer resin BS may include the thermosetting resin. The polymer resin BS may include at least one of the acrylic-based resin, the urethane-based resin, the fluorine-based resin, the epoxy-based resin, the polyester-based resin, the polyamide-based resin, or the silicone-based resin. As an example, the polymer resin BS may include the epoxy-based resin. The first preliminary support panel PCP1 may include the light blocking material LSM. The light blocking material LSM may include at least one of graphene, carbon black, or carbon nanotubes. As an example, the light blocking material LSM may include the graphene. The light blocking material LSM may absorb a light traveling to the lower surface DP-LF (refer to FIG. 5) of the display panel DP (refer to FIG. 13B) from the outside of the display panel DP (refer to FIG. 13B) to improve the luminance of the display device. The forming of the first preliminary support panel PCP1 in the through-hole HL (S300) may include forming the resin pattern LSB and planarizing the resin pattern LSB.

In the forming of the resin pattern LSB, the resin pattern LSB may be formed by the flocculation of the resin LS discharged from the discharge part RIP. The resin pattern LSB may be disposed on the mask part MKP. The resin pattern LSB may be formed adjacent to the through-hole HL.

The resin pattern LSB may be planarized by a squeegee SQ in the planarizing of the resin pattern LSB. As an example, the squeegee SQ may move to pass across the through-hole HK to allow the resin pattern LSB to be placed in the through-hole HL, and thus, the first preliminary support panel PCP1 may be formed.

Referring to FIGS. 11 and 15A to 15C, the heating part HP may be placed close enough to the first preliminary support panel PCP1 to transfer the heat to the first preliminary support panel PCP1 and to cure a portion of the first preliminary support panel PCP1 in the forming of the second preliminary support panel PCP2. The first heating part HP1 may overlap the center part MDP in a plan view. The second heating part HP2 may overlap the edge part BDP in a plan view. The first heating part HP1 and the second heating part HP2 included in the heating part HP may be operated separately. As an example, the second heating part HP2 may radiate heat while the first heating part HP1 does not radiate heat. The heating part HP may cure only a portion of the heating part HP to be cured by separately operating the first heating part HP1 and the second heating part HP2. The second heating part HP2 may transfer the heat to at least the edge part BDP to form the second preliminary support panel PCP2. The second preliminary support panel PCP2 may include a center part MDP' and an edge part BDP' surrounding the center part MDP' in a plan view. The second heating part HP2 may transfer heat to the edge part BDP at a temperature of about 60 degrees in Celsius or more and about 90 degrees in Celsius or less for a period of not less than about 1 minute but not more than about 5 minutes. By this heating of the edge part BDP, the edge part BDP may be changed to edge part BDP'.

Figure 15A:
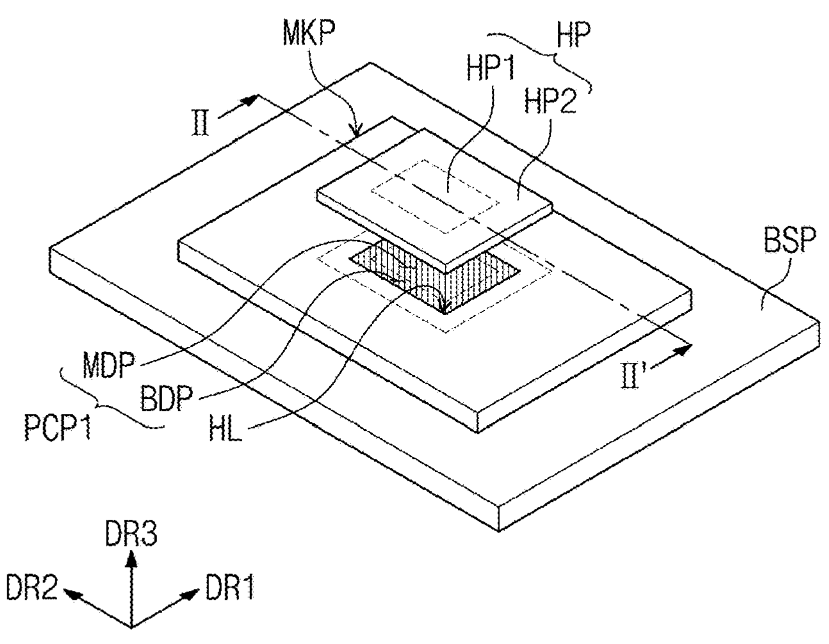
Figure 15B:
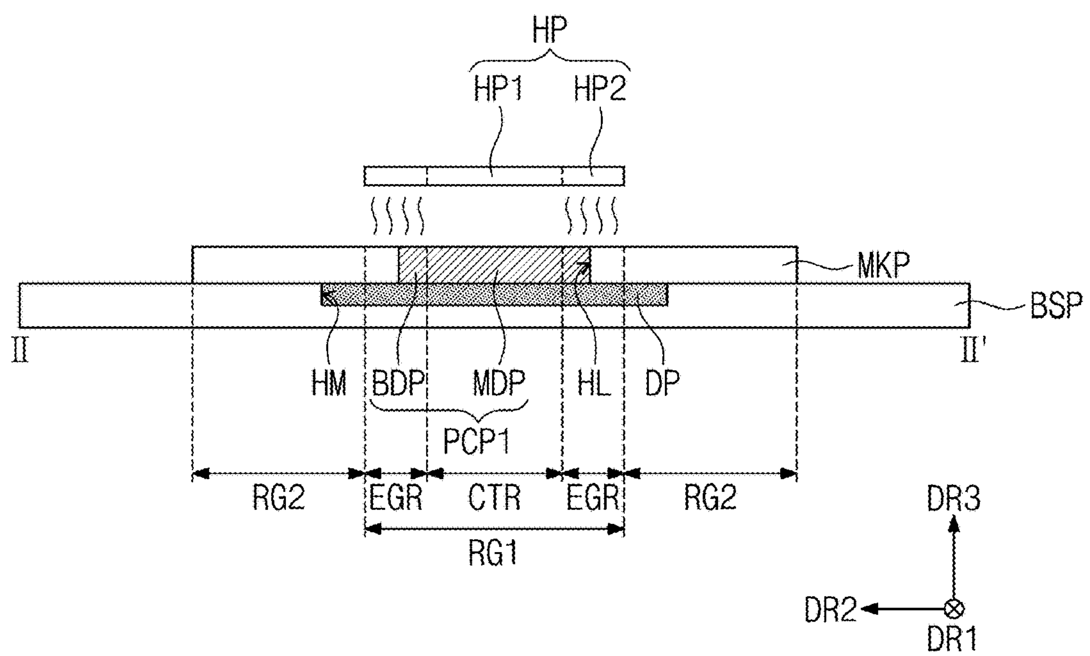
FIGS. 15B to 15E are cross-sectional views taken along line II-II' of FIG. 15A to illustrate processes of a method of manufacturing a support panel.
Figure 15C:
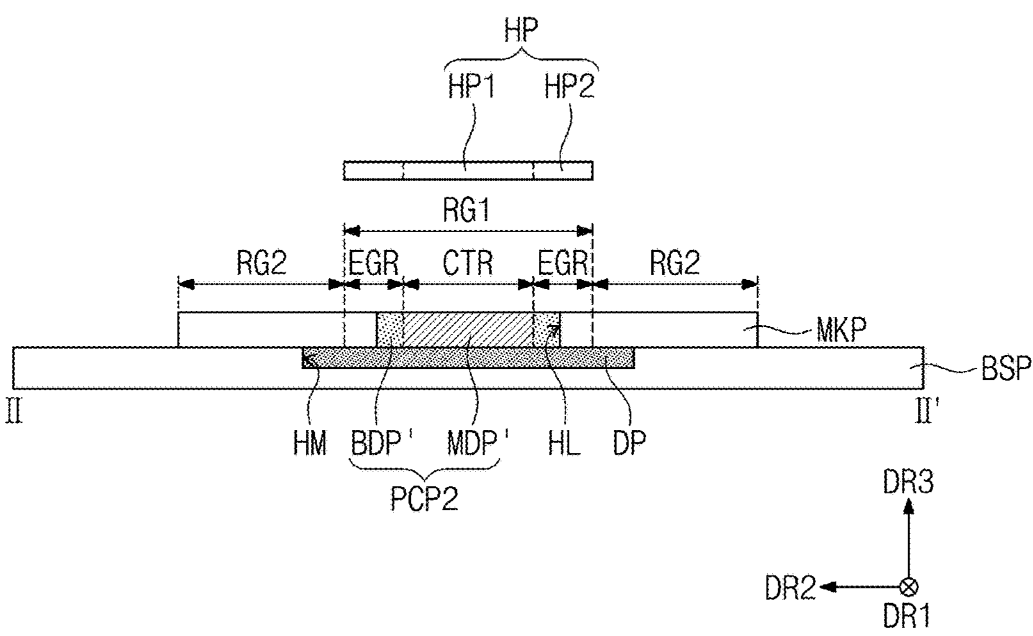
Figure 15F:
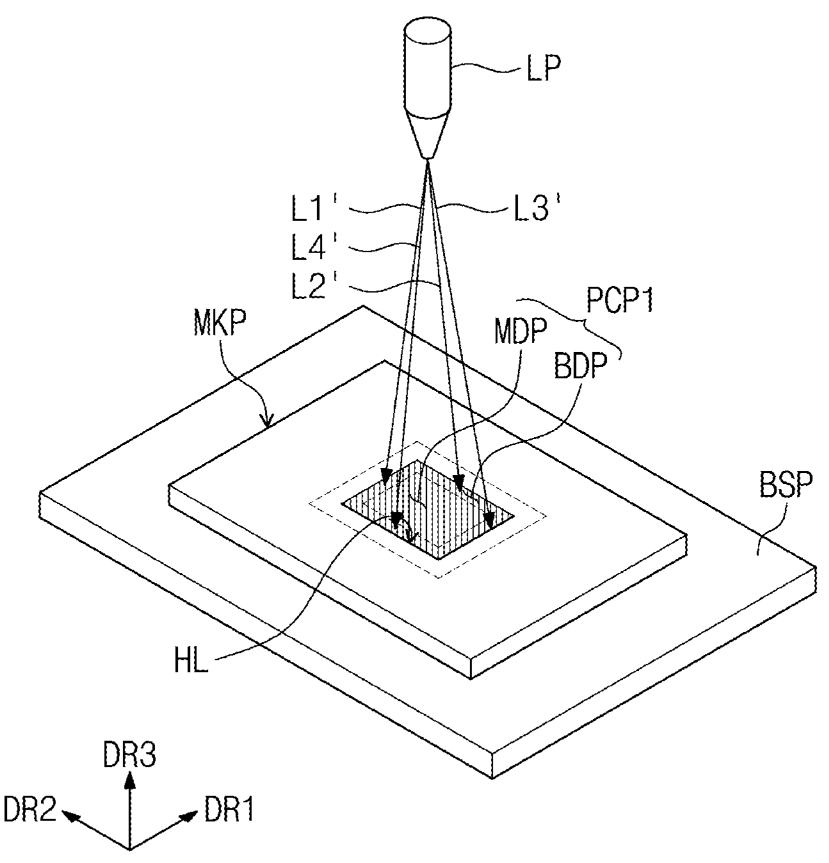
FIG. 15F is a perspective view illustrating a process of a method of manufacturing a support panel according to another embodiment of the present disclosure.
Figure 16:
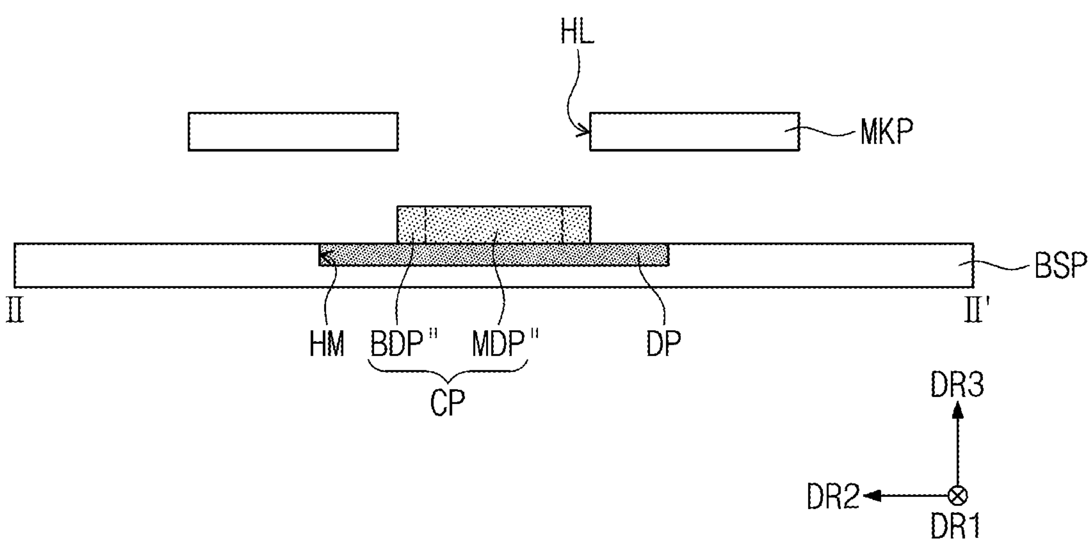
FIG. 16 is a cross-sectional view taken along line II-II' of FIG. 15A to illustrate a process of a method of manufacturing a support panel.

Different from FIGS. 15A to 15C, a device applying the heat to the edge part BDP may be the laser irradiation device LP. Referring to FIGS. 11 and 15F, in the forming of the second preliminary support panel (S400), the first, second, third, and fourth lights L1, L2, L3, and L4 may be irradiated to the edge part BDP using the laser irradiation device LP, and thus, the edge part BDP may be cured.

Figure 15D:
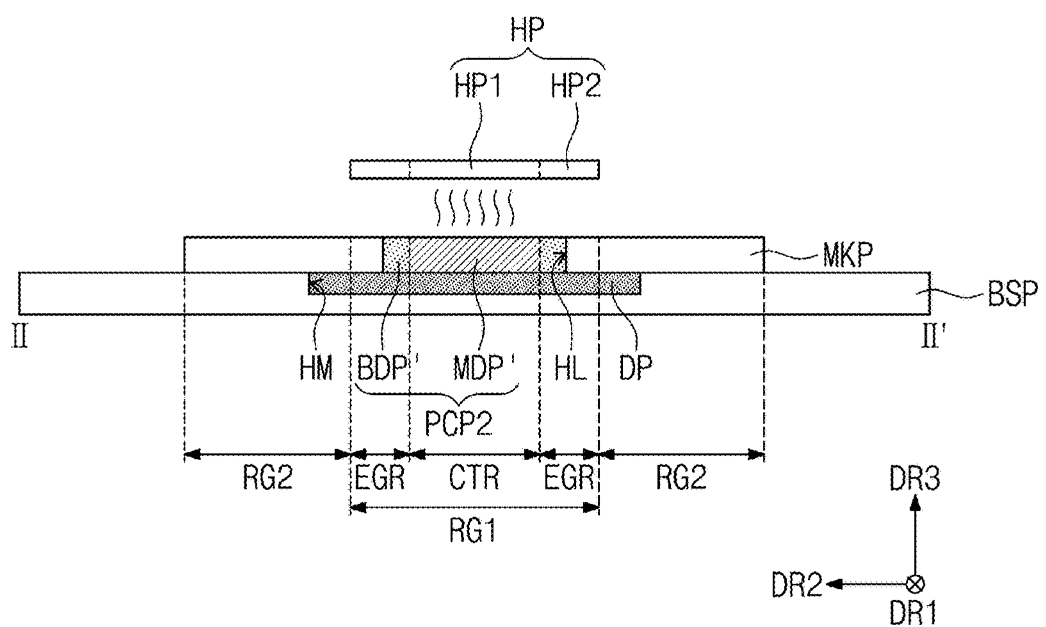
Figure 15E:
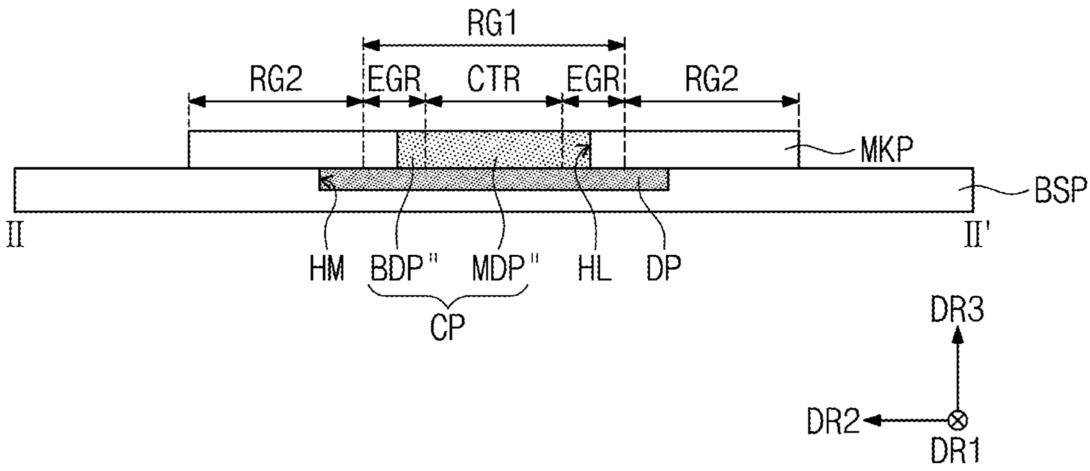

Referring to FIGS. 15D and 15E, the support panel manufacturing method may further include transferring heat to the center part MDP' to form the support panel CP after the forming of the second preliminary support panel PCP2 and before the separating of the mask part MKP from the display panel DP. The support panel CP may include a center part MDP" and an edge part BDP" surrounding the center part MDP" in a plan view. In the transferring of the heat to the center part MDP', the heat may be transferred to the center part MDP' by heating the first heating part HP1. The first heating part HP1 may transfer the heat to the center part MDP' at a temperature of about 60 degrees in Celsius or more and about 90 degrees in Celsius or less for a period of not less than about 1 minute but not more than about 5 minutes. By this heating of the center part MDP', the center part MDP' may be changed to the center part MDP".

Meanwhile, different from FIGS. 15B to 15E, according to the support panel manufacturing method, the heat may be transferred to the first region RG1 at a temperature of about 60 degrees in Celsius or more and about 90 degrees in Celsius or less for a period of not less than about 1 minute but not more than about 5 minutes by substantially simultaneously heating the first heating part HP1 and the second heating part HP2. That is, the thermosetting of the edge part BDP and the thermosetting of the center part MDP may be performed at once through the same process.

Referring to FIGS. 11 and 16, the mask part MKP may move in the third direction DR3 and may be separated from the display panel DP in the separating of the mask part MKP from the display panel DP (S500).

According to a conventional support panel manufacturing method, when separating a mask part, a polymer resin directly in contact with the mask part maintains adhesion in an uncured state, and thus, it is difficult to planarize a support panel. According to the present disclosure, before the mask part is separated, the edge part that is in direct contact with the mask part is thermoset first, and thus, the flatness of the support panel may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:

1. An apparatus for manufacturing a support panel, comprising:

a base part provided with a recess formed therein to allow a display panel to be disposed;

a mask part on the base part and comprising a first region overlapping the display panel in a plan view and a second region surrounding the first region;

a discharging part provided above the mask part and configured to discharge a resin onto the display panel; and a heating part configured to operate in one of a first state and a second state, wherein the mask part is provided with a through-hole defined therethrough in the first region, the first region comprises an edge region adjacent to the second region and a center region surrounded by the edge region in the plan view, the heating part is spaced apart from the mask part in the plan view in the first state, the heating part overlaps the first region in the plan view in the second state, and the heating part is configured to transfer a heat to at least the edge region in the second state to cure at least a portion of the resin.

2. The apparatus of claim 1, wherein the heating part is in the mask part.

3. The apparatus of claim 1, wherein the heating part comprises a laser irradiation device.

4. The apparatus of claim 1, wherein the heating part is configured to transfer heat to the edge region and the center region in the second state.

5. The apparatus of claim 1, wherein the mask part comprises an invar.

6. The apparatus of claim 1, wherein the recess has a size greater than a size of the through-hole in the plan view.

7. The apparatus of claim 1, wherein the heating part maintains a temperature of about 60 degrees to about 90 degrees in Celsius for a period of about 1 minute to about 5 minutes in the second state.

8. A method of manufacturing a support panel, comprising:

providing a base part in which a recess is formed and a display panel in the recess;

placing a mask part in which a through-hole is formed to allow the display panel to overlap the through-hole in a plan view;

forming a first preliminary support panel comprising a resin, the first preliminary support panel comprising an edge part directly in contact with the mask part and a center part surrounded by the edge part in the through-hole in the plan view;

forming a second preliminary support panel by transferring first heat to at least the edge part to cure at least a portion of the resin; and separating the mask part from the display panel.

9. The method of claim 8, wherein the first preliminary support panel comprises a polymer resin.

10. The method of claim 9, wherein the polymer resin comprises at least one of an acrylic-based resin, a urethane-based resin, a fluorine-based resin, an epoxy-based resin, a polyester-based resin, a polyamide-based resin, or a silicone-based resin.

11. The method of claim 8, wherein the first preliminary support panel comprises a light blocking material.

12. The method of claim 11, wherein the light blocking material comprises at least one of graphene, carbon black, or carbon nanotubes.

13. The method of claim 8, wherein the edge part receives the first heat at a temperature of about 60 to about 90 degrees in Celsius for a period of about 1 minute to about 5 minutes in the forming of the second preliminary support panel.

14. The method of claim 8, wherein the forming of the first preliminary support panel comprises:

forming a resin pattern to be adjacent to the through-hole on the mask part; and planarizing the resin pattern.

15. The method of claim 14, wherein the planarizing of the resin pattern is performed using a squeegee.

16. The method of claim 8, wherein the forming of the second preliminary support panel comprises irradiating a laser to transfer the first heat.

17. The method of claim 8, wherein the through-hole has a size smaller than a size of the display panel in the plan view.

18. The method of claim 8, wherein the first preliminary support panel is directly in contact with the mask part.

19. The method of claim 8, wherein the recess has substantially a same size as a size of the display panel in the plan view.

20. A method of manufacturing a support panel, comprising:

providing a base part in which a recess is formed and a display panel in the recess;

placing a mask part in which a through-hole is formed to allow the display panel to overlap the through-hole in a plan view;

forming a first preliminary support panel comprising an edge part directly in contact with the mask part and a center part surrounded by the edge part in the through-hole in the plan view;

forming a second preliminary support panel by transferring first heat to at least the edge part;

separating the mask part from the display panel; and transferring second heat to the center part to form the support panel, after the forming of the second preliminary support panel and before the separating of the mask part from the display panel.

* * * * *